United States Patent

[11] 3,604,801

| [72] | Inventor | Joseph W. Young<br>New Preston, Conn. |
|---|---|---|
| [21] | Appl. No. | 736,161 |
| [22] | Filed | June 11, 1968 |
| [45] | Patented | Sept. 14, 1971 |
| [73] | Assignee | The Superior Electric Company<br>Bristol, Conn. |

[54] FILM EXPOSING MACHINE FOR MAKING NEGATIVES
4 Claims, 12 Drawing Figs.

[52] U.S. Cl. .................................................. 355/101,
355/83, 355/91, 355/133
[51] Int. Cl. ..................................................... G03b 27/04
[50] Field of Search ........................................... 355/78, 83,
84, 86, 88, 91, 93, 94, 95, 99, 101, 133; 95/4.5, 1

[56] References Cited
UNITED STATES PATENTS

| 3,204,544 | 9/1965 | Shannon ....................... | 355/133 |
| 2,787,654 | 4/1957 | Perry ............................ | 95/4.5 X |
| 3,176,601 | 4/1965 | Bradley ........................ | 355/91 |
| 3,313,223 | 4/1967 | Frantzen ...................... | 355/102 X |
| 3,323,414 | 6/1967 | Ritchie et al. ................. | 88/24 |
| 3,457,012 | 7/1969 | Ucko et al. ................... | 355/78 X |
| 3,460,448 | 8/1969 | Oliver .......................... | 95/1 |

*Primary Examiner*—Samuel S. Matthews
*Assistant Examiner*—Richard L. Moses
*Attorney*—Johnson & Kline ABSTRACT: A machine that moves a light sensitive film with respect to a light beam along X and Y axes, in which the light beam is controlled as to shape and image on the film by means of an indexable wheel carrying differently shaped apertures with the aperture in alignment with the beam defining the shape of the image formed, and in which the beam impingement on the film is also controlled to permit movement without producing an image. The machine has especial utility in making printed circuit board film negatives as it is capable of automatic operation by a numerically controlled system using programmed commands.

INVENTOR.
Joseph W. Young

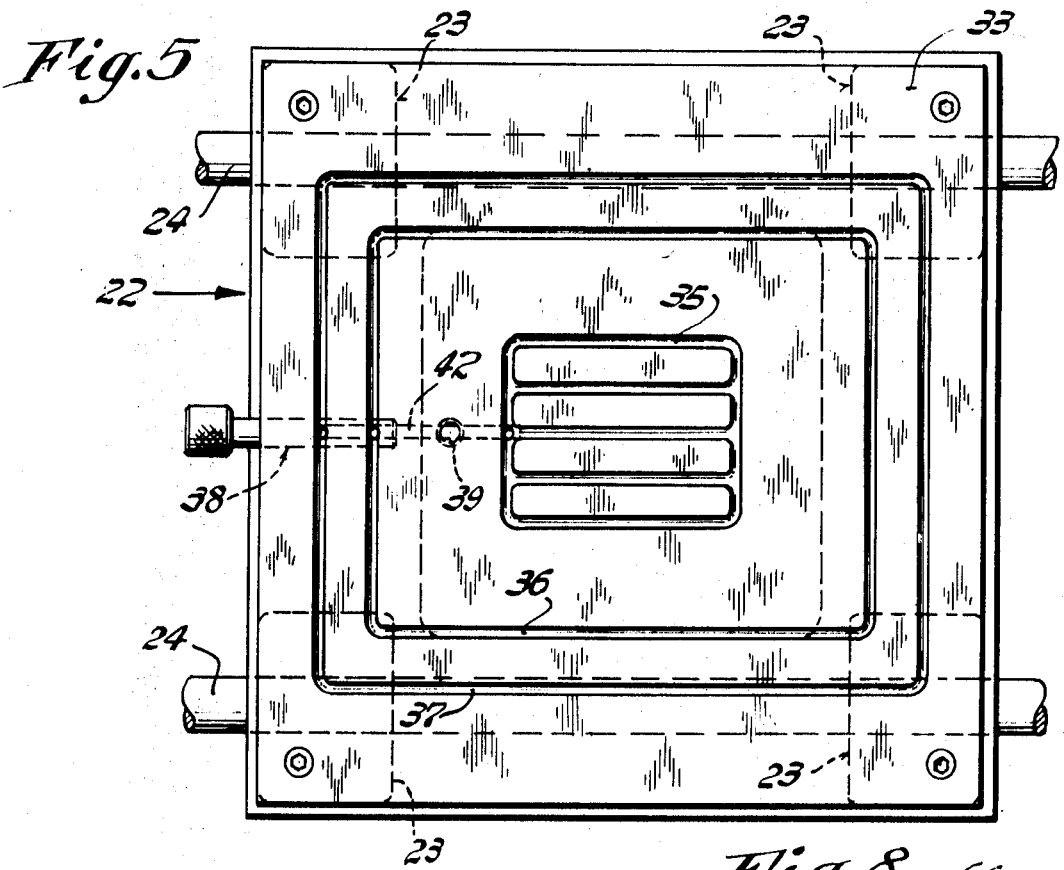
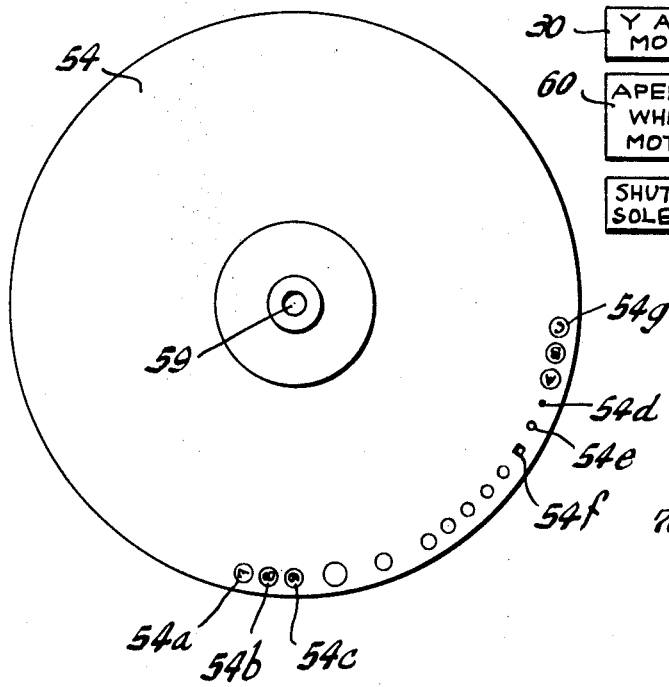
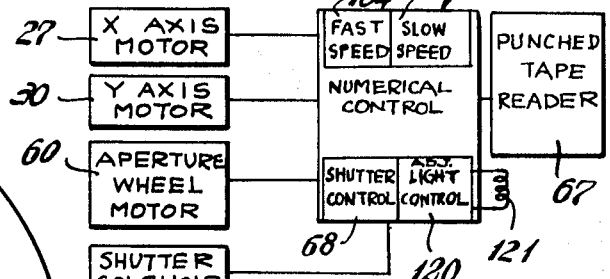
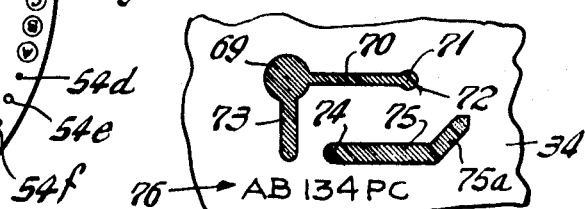

INVENTOR.
Joseph W. Young
BY
Johnson and Kline
ATTORNEYS

FILM EXPOSING MACHINE FOR MAKING NEGATIVES

The conventional method of making printed circuit boards has generally involved the use of a photographic film negative of the board with the negative being an image of a drawing of the board. The making of the drawing has not only been extremely time-consuming and hence expensive but also difficulty in obtaining preciseness was encountered. As a board may have many lines of different width and extent, different size "-pads," letters and numerals, machinery and methods that have heretofore been suggested to obviate the making of a drawing have not been completely accepted by the industry for many reasons including cost, additional operations, limitations of range of operation, etc. Thus while it has been recognized that it is desirable to obviate the need for a drawing, there has not heretofore been an apparatus which has had characteristics which make it generally acceptable for making printed circuit board negatives or negatives of other items having somewhat similar traits.

It is accordingly an object of the present invention to provide an apparatus for forming a film negative having different width and extent lines, characters and shapes by the use of a light beam relatively moved with respect to an unexposed film.

Another object of the present invention is to provide a apparatus for forming an image on a film which is capable of being automatically controlled to be operated by programmed instructions.

A further object of the present invention is to achieve the above objects with an apparatus that is simple in construction, reliable in use and easily operated but yet produces negatives having images precisely formed.

In carrying out the present invention, there is provided a planar film-supporting surface on which a sheet of unexposed photographic film is positioned and securely held as by a vacuum. A light source which produces a light beam which effects exposure of the film is directed onto the film. The shape of the light beam, however, is controlled by it being passed through an aperture that is spaced slightly from the plate and the shape of the aperture determines the shape of the image. For providing different shapes, there is a separate aperture for each shape and the apertures are formed in an indexable wheel that is mounted to enable anyone of the apertures to be positioned to control the shape of the light beam. The light beam is further controlled by a shutter which governs whether or not the light beam will impinge on the film to produce an image by it being either in its opened or closed position.

With the above structure, an image will be formed on the film corresponding to the shape of the selected aperture when the shutter is opened. For producing a line, the aperture having the width of the line is initially selected, the shutter maintained open and the film is moved relative to the light beam along X and Y axes. The extent of the line is conterminous with the combined movement along the axis.

The regulating of the X movement, Y movement, shutter position and aperture indexing are each controlled by an electromechanical device which is capable of translating electrical commands into a desired result. Thus there is an X axis motor, a Y axis motor and an aperture wheel motor with each of the motors being of the stepping type that will produce a determined movement for each command. The shutter position may be achieved by the energizing or deenergizing of a solenoid. Complete automatic control of the machine is thus achieved and to form a desired image on the film, programmed instructions may be accordingly employed. Specifically a numerical control system that is commercially available from the assignee of the present invention under the trademark "SLO-SYN" has been found especially suitable with the instructions for the movement of the different devices being programmed on punched tape. Thus as the tape is processed in the system, the different portions of the image will be automatically formed.

Other features and advantages will hereinafter appear.

In the drawing:

FIG. 5 is a plan of the film-supporting surface.

FIG. 7 is a view of the aperture wheel.

FIG. 8 is a block diagram of the controls of the machine.

FIG. 9 is an illustration of a portion of an image which may be formed on the film.

Figure 1:
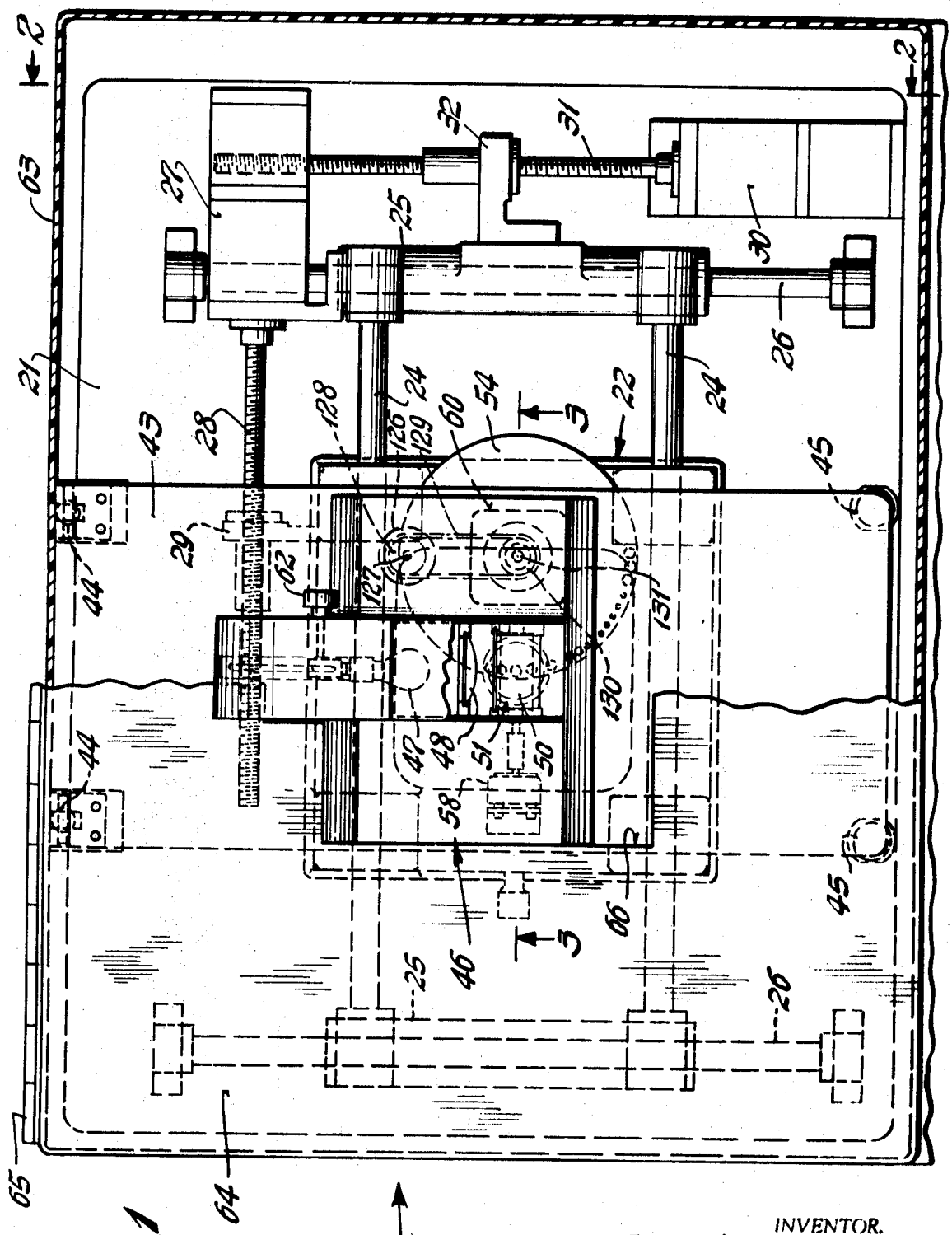
FIG. 1 is a plan view with portions of the cover removed to show details of construction.

Referring to the drawing, the apparatus, for forming an image on an unexposed film is generally indicated by the reference numeral 20 and includes a rigid base 21 on which a table 22 is supported. The table is mounted for movement on X and Y axes by the use of ball bushings 23 and shafts 24 for the X axis and ball bushings 25 and shafts 26 for the Y axis.

The movement of the table is accurately controlled along each axis and referring to the X axis it is controlled by a stepping motor 27 that drives a threaded shaft 28 which cooperates with a ball nut 29 that is fastened to the table such that rotary movement of the motor 27 is translated into linear movement along the X axis. Similarly, a motor 30 through a threaded shaft 31 and a ball nut 32 effects movement of the table in the Y direction. The amount of movement in each direction is determined by the extent of movement of the motors with the table moving along these axes, either simultaneously or individually in a plane.

Figure 6:
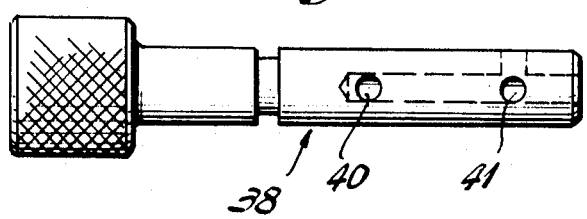
FIG. 6 is a detail of a vacuum valve.

A top surface 33 of the table is planar and adapted to support a sheet of unexposed photographic film 34. To maintain the film flat against the surface 33, there is formed in the surface a plurality of grooves 35, 36 and 37 (FIG. 5) having the shapes shown, and they are connected through a valve 38 and tubing 39 to a source of vacuum. The valve 38, as shown in FIG. 6, has a port 40 which in one angular position will effect communication between the groove 37 and the tubing 39 and a port 41 for effecting communication between the groove 36 and the tubing 39. The groove 35 communicates continuously with the tubing 39 as by a passageway 42 formed in the table 22. It will be understood that for small sized film only the groove 35 has vacuum applied thereto by the angular position of the valve 38 preventing the ports 40 and 41 from communicating with the tubing 39. For larger size film both the grooves 35 and 36 may have vacuum supplied thereto by a different angular position of the valve 38; and for the largest size of film, all grooves may have vacuum connected thereto. The use of vacuum assures that the film will be held securely against the flat table top to move in the same plane therewith.

Positioned above the surface 33 is a flat plate 43 that is pivoted at the back of the machine on posts as at 44 to rest on pillars 45 that are fastened on the base at the front of the machine. The plate 43 supports a housing 46 which contains an incandescent bulb 47. Light from the bulb 47 is directed through a first converging lens 48 and a second converging lens 49 by the use of a mirror 50. As the light beam is directed downward through the lens 49 it passes through a shutter mechanism generally indicated by the reference numeral 51; an opening 52 formed in the plate 43 and an aperture 53 formed in an aperture wheel 54 to impinge on the film 34.

Figure 3:
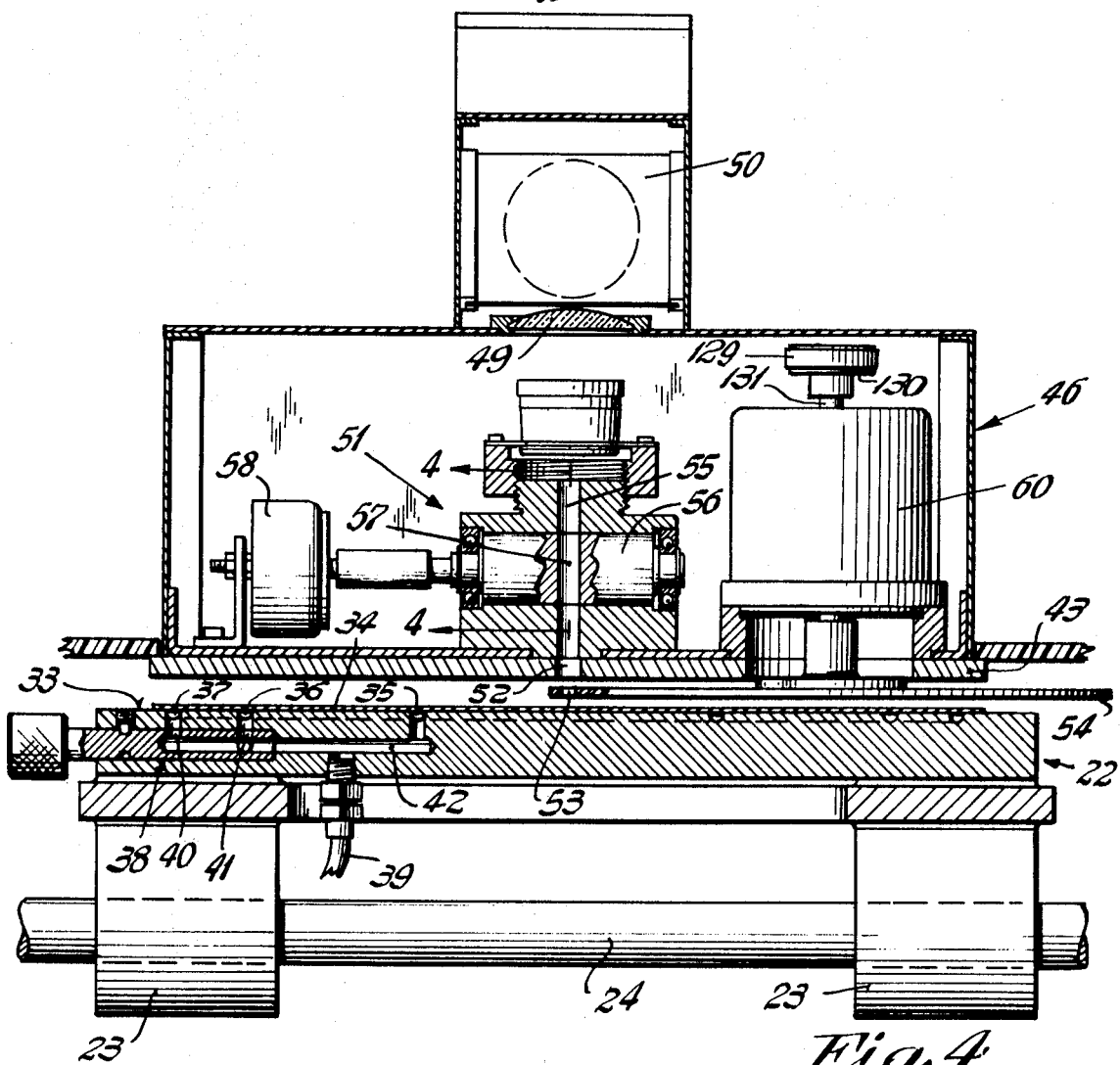
FIG. 3 is a section somewhat enlarged taken on the line 3—3 of FIG. 1.
Figure 4:
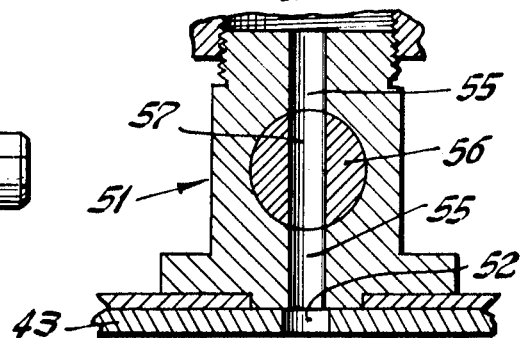
FIG. 4 is a section, somewhat enlarged, taken on the line 4—4 of FIG. 3 and showing details of the shutter.

The shutter mechanism 51 (FIG. 3) includes a passageway 55 which has a rotatable cylinder 56 having a through hole 57 transversely extending with respect thereto. As will be seen in FIG. 4, when the passageway 55 and the through hole 57 are aligned, light may be passed therethrough while for preventing passage of light, the cylinder 56 may be rotated, for example 90°, to completely block the passage of light.

For rotating the cylinder 56, there is provided a rotary solenoid 58 which in its normal unenergized position produces blockage of the light but which when energized rotates the cylinder 56 to align the passageway 55 and hole 57 to enable light passage therethrough as shown.

Referring to FIG. 7, the aperture wheel 54 consists of a flat disk having a plurality of apertures 54a, 54b, 54c, etc. that are located on an arc that is spaced from the center 59 of the wheel. Each of the apertures is provided with a shape which is different, such that the aperture 54d may be a circle of 0.003-inch dia., the aperture 54e, 1/16-inch dia.; 54f, 1/16-inch square, etc. In addition to circular and square apertures, the apertures are also shaped to form other specific images, and thus the aperture 54a may have the shape of the number 7, the aperture 54b the number 8, etc. Moreover, letters of the alphabet, such as the letter C shown in aperture 54g are also included in the wheel. It will be understood that while only a few of the apertures are shown, that there will be sufficient apertures to contain not only various diameter circular and square openings but also shapes which include each letter of the alphabet and each digit though of course if desired other configurations and shapes may be utilized in place depending on the images desired to be formed.

The center 59 of the wheel is aligned with the axis of a motor 60 to be supported thereby with the motor being mounted within the housing 46 on the plate 43. The arc on which the apertures are positioned, is made to be in alignment with the light beam passing through the passageway 55 so that indexing the wheel 54 by operation of the motor 60 will position the aperture having the shape of the desired image in alignment with the passageway 55. It will also be understood that the wheel 54 is closely spaced to the top surface of the film 34 and thus divergence of light through an aperture is substantially obviated to thus have the image formed precisely coincide with the shape of the opening in the aperture.

Figure 2:
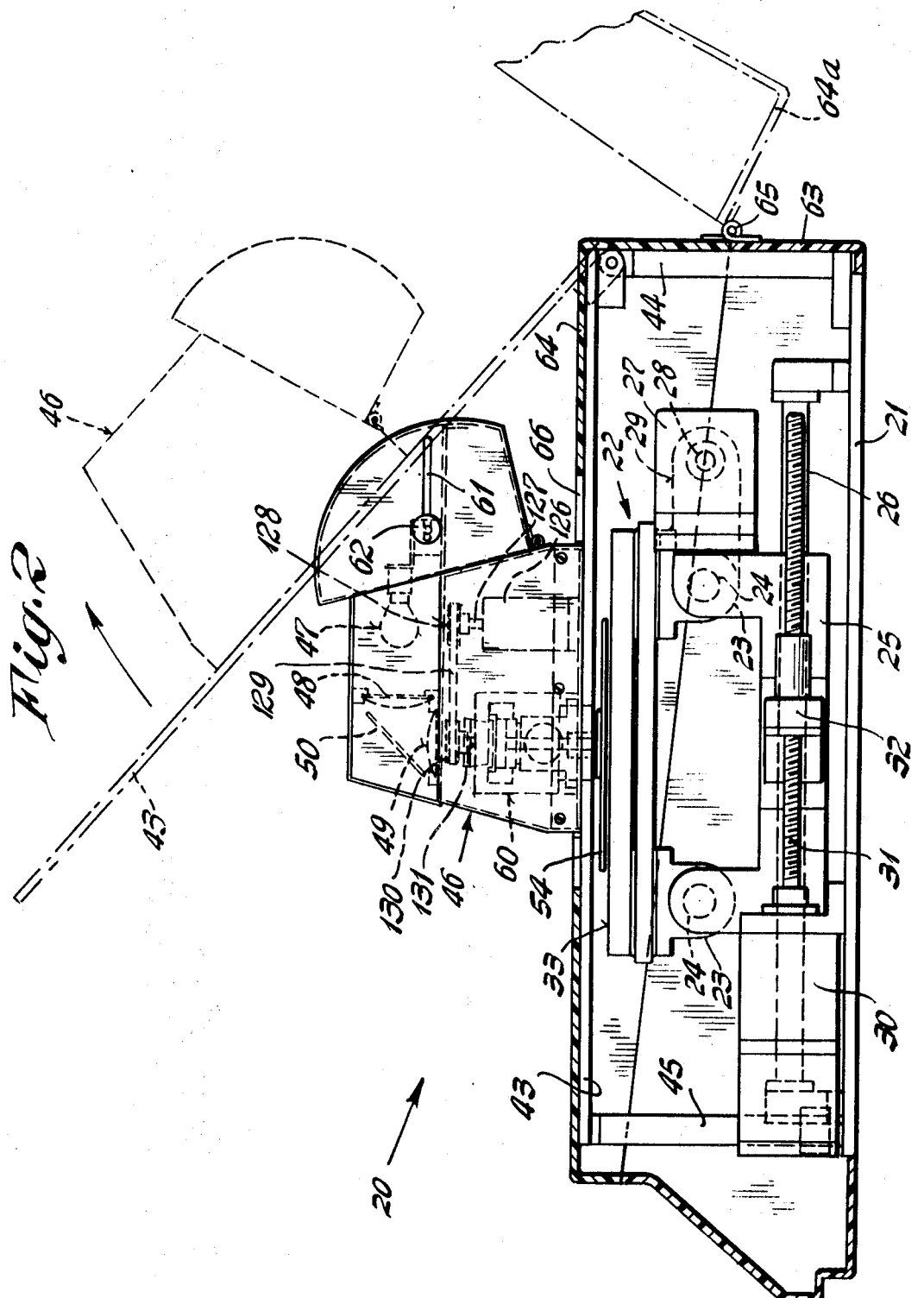
FIG. 2 is a side section taken on the line 2—2 of FIG. 1.

The bulb 47 (FIG. 2) is mounted in the housing 46 by means of a slot 61 and thumbscrew 62 to thereby enable control over the focal length between the film and bulb, by adjusting the distance between it and the film 34.

While the herein disclosed embodiment of the machine describes the use of an incandescent bulb 47 and the utilizing of light reactive film 34, it is within the scope of the invention to employ other types of light source which are utilizable with other types of film which require special light sources for exposure.

In order to maintain the film from being exposed to extraneous light, there is provided an enclosure for the table which includes a bottom portion 63 that is made fast to the base 21 and a cover 64 that is pivoted as at 65 on the bottom portion. The cover includes a cutout 66 which enables it to move between its solid line, lighttight position shown in FIG. 2 with the housing 46 projecting therethrough and its dotted line position, indicated by the reference numeral 64a, wherein it permits access to the interior.

From the foregoing it will be understood that each of the controllable elements is operated by an electromechanical device such as a solenoid 58 and motors 27, 30 and 60. Specifically, the motors 27, 30 and 60 are commercially available under the trade name "SLO-SYN" from the the of the present invention and further each of these motors is capable of being operated by a commercially available numerical control system indicated by a block 66 in FIG. 8. The system accepts commands from a punched tape reader 67 which "reads" a perforated tape that contains commands for each of the devices. Thus the tape may have a command for a determined movement of either or both of the X or Y axes motors 27, 30 and also for the indexable position of the motor 60 to set the aperture to be in alignment with the passageway 55. Moreover, the system includes a flip-flop 68 in which a command from the reader 67 may be programmed to control whether or not the solenoid 58 is to be energized and thus in its light-passing position or whether it will be maintained in its light-blocking position when the command is carried out.

In the operation of the machine, a user initially moves the cover to its dotted line position 64a and pivots the plate 43 to permit access to the surface 33 of the table. A piece of unexposed film is placed on the table within appropriate guides (not shown) and the valve 38 is adjusted to control the vacuum in only the grooves that lie beneath the film. The plate 43 is then returned to its solid line position and the cover 64 closed.

After the bulb 47 has been energized, commands on perforated tape are read by the tape reader 67 and automatically performed with the commands dictating the image to be formed on the film. If, as shown in FIG. 9, the first command may be the forming of a circle 69, the aperture wheel motor 60 is indexed to position the aperture of the wheel 54 that has an opening which corresponds with the size of the circle 69 to be aligned with the light beam. The solenoid 58 may then be energized and deenergized to effect the forming of the image of circle 69. The next command may be a line 70 from the center of the circle 69 along the X axis and this line is formed by initially indexing the aperture wheel to position an aperture having a diameter equal to the desired width of the line 70 in the light beam and then subsequently moving the X axis motor until it has produced sufficient movement to position the point 71 under the light beam. To form the image of a circle 72, the next instruction merely requires rotating the aperture wheel motor to provide the proper sized aperture. Another image may be a line 73 which may be formed by the next command returning the table to the center of the circle 69 with the shutter closed, then indexing the aperture wheel to position the aperture having a diameter that is equal to the desired width of the line 73 and then providing subsequent motion on the Y axis while maintaining the shutter opened. If it is desired to move from the end of line 73 to, for example a point 74 which is the beginning of a lie 75, then movement is achieved by the motors 27 and 30 but with the shutter being in its blocking position.

It will also be appreciated that by the use of the aperture wheel, data 76 may be formed on the image by indexing the wheel to have the desired character in alignment with the light beam and then subsequently moving to the position of the next character after operation of the shutter.

Figure 10:
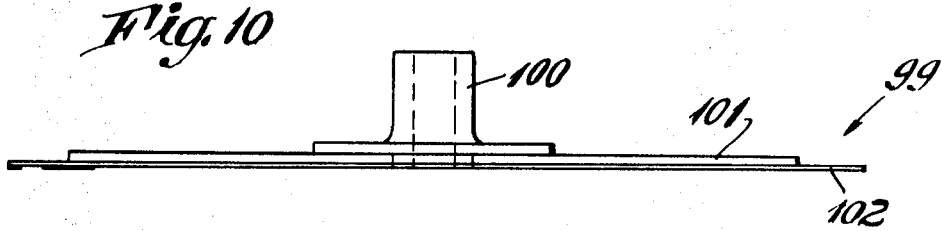
FIG. 10 is a side view of a different embodiment of the index wheel.
Figure 11:
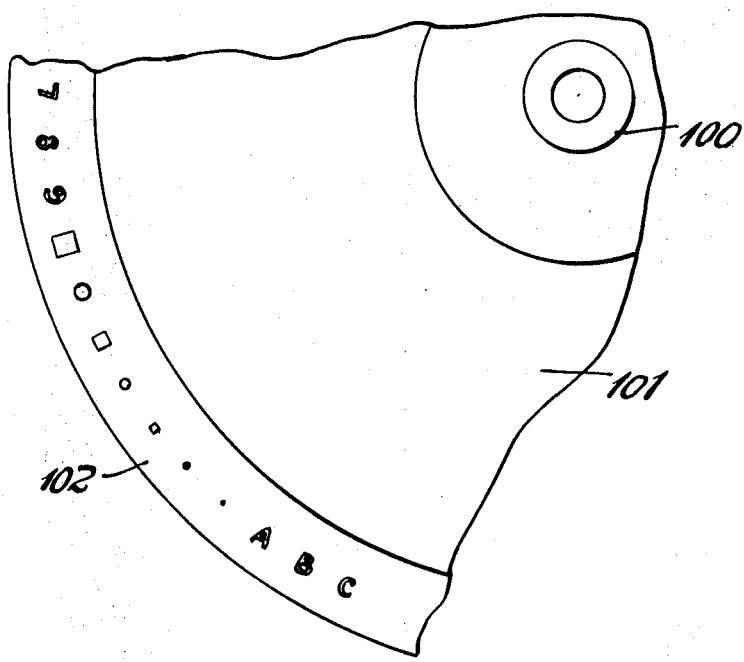
FIG. 11 is a plan view of a portion of the wheel of FIG. 10, somewhat enlarged.

Shown in FIGS. 10 and 11 is another embodiment of the aperture wheel. In this embodiment the wheel 99 consists of hub 100 and flat support disk 101. The images are photographically formed on the exterior periphery of a plastic plate 102. Particularly the plate may be of 1/16-inch clear plastic having on its bottom surface a photographic emulsion which when developed forms an emulsion free shape of the desired image. The images are radially spaced, if a "SLO-SYN" stepping motor is employed about 3 steps apart or 5.4° so that the images are in effect "apertures" having such a spacing. Also the images, specifically the numbers and characters, may be formed to have the periphery of the plate, a base line which if utilized, will require the inverting of the X and Y axes if the same tape is to be used for this embodiment of the wheel as is used for the prior embodiment.

The film 34 while heretofore disclosed as making a "negative" may also be of the autopositive type which has emulsion where exposed to light and is emulsion free where unexposed. If this type of film is used, the developed film will be directly usable in making a silk screen image. It is thus to be understood that the term "negative" is to be construed to include a developed film which may be a "negative" or a "positive" image of the exposed portion.

In addition to forming lines along the axis, a line may also be formed at a 45 degree angle to the axes by the simultaneous operation of both axes motors at the same speed. Such a line is shown in FIG. 9 and indicated by the reference character 75a. When forming this line, the speed of movement of the film is about 1.4 times the speed along just one axis which decreases the amount of light impinging on the film and which thus could effect the formation of the image even with wide latitude exposure film.

The present invention provides a circuit for decreasing the speed of the motors when they are both simultaneously operated by the use of a slow speed pulse supplying oscillator 103 which is in addition to a fast speed oscillator 104. The slow speed oscillator 103 may be connected by appropriate logic circuitry to function only when a movement requires both motors must be operated simultaneously to form a 45°-line to thereby maintain a relatively constant value of light impinging on the film.

Figure 12:
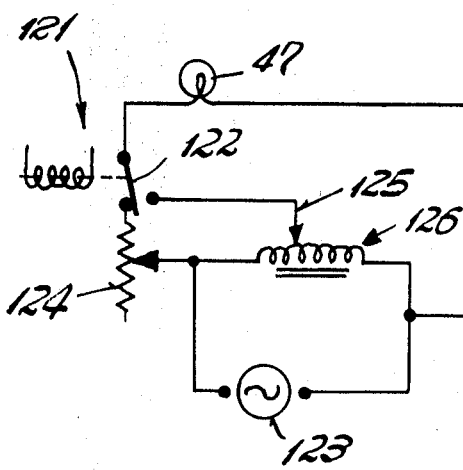
FIG. 12 is an electrical schematic diagram of a circuit for controlling light intensity when forming lines having different widths.

It has also been found that the size of the aperture will also determine the quantity of light striking the film when a line is being made, by the larger apertures permitting greater passage than the smaller for each infinitely sized portion of the line. To overcome this variation and adjust the intensity of the light for the size of the aperture that is forming a line, the numerical control system has a block 120 (such as a flip-flop) which when activated energizes a relay 121. As shown in FIG. 12, the relay has a contact arm 122 which in the unenergized state connects the bulb 47 to a source of AC 123 through an adjustable resistance 124. In the other or energized relay condition, the arm 122 connects the bulb to the brush 125 of an autotransformer 126 so that the voltage across the bulb is determined by the setting of the brush.

As shown in FIG. 1, the autotransformer has a shaft 127 that carries a pulley 128 connected by a toothed belt 129 to a pulley 130 that is fastened on the other end 131 of the shaft of the motor 60. Thus as the motor 60 turns the index wheel, it also accurately moves the brush 127. The accurate correlation of movements of the brush movement and the index wheel is set by the pulley ratios with the smallest aperture causing about 80 volts to be impressed on the bulb 47 and the largest aperture about 60 volts. The setting of the adjustable resistor is about 70 volts with the bulb 47 normally being rated for 110 volt service.

It has been found desirable to utilize film that has high contrast and good resolution with wide development and exposure latitude.

It will accordingly be appreciated that there has been disclosed a machine that may automatically form desired images on film by exposing the film to a light source. The shape of the images is selected by indexing of a wheel having a plurality of shaped apertures to have the shaped aperture desired be positioned above the film in the position where the image is wanted and then light is directed onto the film to form an image of the selected shape. The film is moved relative to the light source to both enable the positioning of the film with respect to the light source and also to enable linear or elongate images to be formed. The machine is especially suitable for automatic operation by having each function capable of being programmed and then having the program effected through the use of a numerical controlled system.

Variations and modifications may be made within the scope of the claims and portions of the improvements may be used without others.

I claim:

1. A film-exposing machine comprising a table having an unexposed film-supporting planar surface, means for maintaining the film against the surface, a support mounted for planar movement at least along an axis and on which the table is mounted for movement therewith, light source means for directing a beam of light onto said film an aperture wheel mounted between said source and film to have a peripheral arcuate portion disposed in the path of the beam, said wheel having a plurality of apertures with there being a different shape to each of said apertures and means for indexing the aperture wheel to position the desired shaped aperture in the path of the beam to thereby control the shape of the beam striking the film to form an image with at least the peripheral portion of the wheel having the desired shaped aperture being closely spaced from the supporting surface to minimize divergence of the light beam passing through the aperture onto the portion of the film positioned just beyond the aperture and in which there is a plate for supporting the aperture wheel and means for supporting the plate for pivotal movement, whereby said plate may be pivoted to a position near the film-supporting surface and away from the film-supporting surface to permit access to the said surface.

2. A film-exposing machine comprising a table having an unexposed film-supporting planar surface, means for maintaining the film against the surface, a support mounted for planar movement at least along an axis and on which the table is mounted for movement therewith, light source means for directing a beam of light onto said film, an aperture wheel mounted between said source and film to have a peripheral arcuate portion disposed in the path of the beam, said wheel having a plurality of apertures with there being a different shape to each of said apertures and means for indexing the aperture wheel to position the desired shape aperture in the path of the beam to thereby control the shape of the beam striking the film to form an image with at least the peripheral portion of the wheel having the desired shaped aperture being closely spaced from the supporting surface to minimize divergence of the light beam passing through the aperture onto the portion of the film positioned just beyond the aperture and in which the indexing means includes a stepping motor, means directly connecting the aperture wheel to the motor and in which the motor moves a selected number of steps to position another aperture in the path of the light beam.

3. A film-exposing machine comprising a table having an unexposed film-supporting planar surface, means for maintaining the film against the surface, a support mounted for planar movement at least along an axis and on which the table is mounted for movement therewith, light source means for directing a beam of light onto said film, an aperture wheel mounted between said source and film to have a peripheral arcuate portion disposed in the path of the beam, said wheel having a plurality of apertures with there being a different shape to each of said apertures and means for indexing the aperture wheel to position the desired shaped aperture in the path of the beam to thereby control the shape of the beam striking the film to form an image with at least the peripheral portion of the wheel having the desired shaped aperture being closely spaced from the supporting surface to minimize divergence of the light beam passing through the aperture onto the portion of the film positioned just beyond the aperture and in which the light source means includes an electric bulb and adjustable means for energizing the bulb to alter the intensity of the light from the bulb with the adjustable means being interconnected with the indexing means to alter the intensity with respect to at least some of the apertures being aligned with the beam and means for enabling said adjustable means to be effective to regulate the light intensity only when some of the apertures are aligned with the beam.

4. A film -exposing machine comprising a table having an unexposed film-supporting planar surface, means for maintaining the film against the surface, a support mounted for planar movement at least along an axis and on which the table is mounted for movement therewith, light source means for directing a beam of light onto said film, an aperture wheel mounted between said source and film to have a peripheral arcuate portion disposed in the path of the beam, said wheel having a plurality of apertures with there being a different shape to each of said apertures and means for indexing the aperture wheel to position the desired shaped aperture in the path of the beam to thereby control the shape of the beam striking the film to form an image with at least the peripheral portion of the wheel having the desired shaped aperture being closely spaced from the supporting surface to minimize divergence of the light beam passing through the aperture onto the portion of the film positioned just beyond the aperture and in which the means for relatively moving the table and wheel includes a first motor operable to control movement on one axis and a second motor operable to control movement on the other axis, shutter means interposed between the light source and the aperture wheel and including means for moving the shutter means to either an open beam passing position or a closed beam blocking position; in which there are means for translating programmed instructions to the axes motors, the indexing means and the shutter means to effect automatic control over their operation; and in which the motors relatively move the table along their respective axes at a preselected speed and in which there are means for decreasing the speed of the table when the table is being moved at an angle to the axes by both motors being simultaneously energized.